Sept. 19, 1944.          E. H. HAUG            2,358,394
                 ELECTRIC REGULATING CIRCUIT
                     Filed Dec. 24, 1942
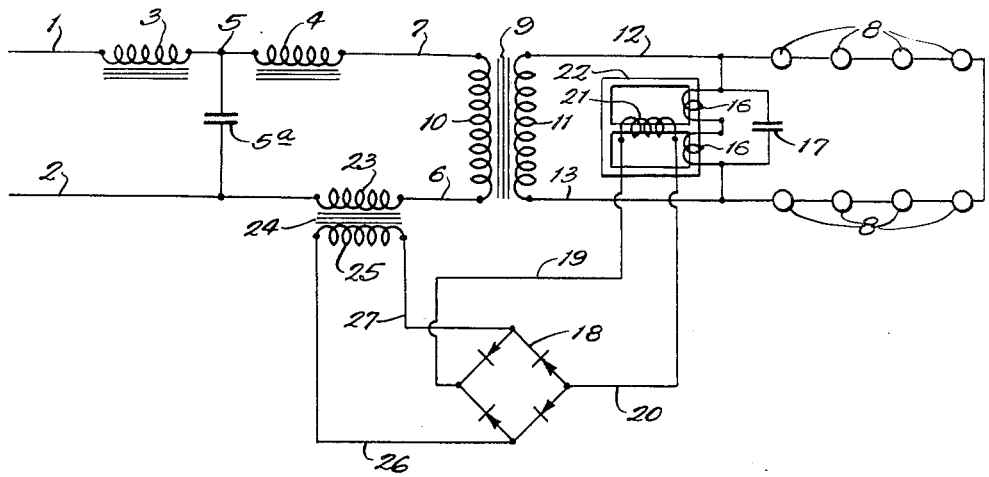
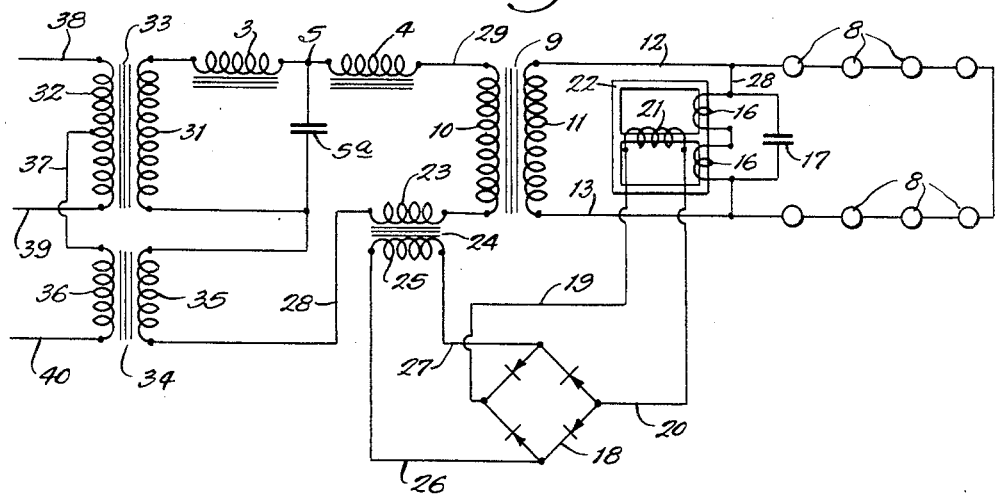
Inventor:
Eugene H. Haug,
By Dawson, Ooms & Booth,
    Attorneys.

Patented Sept. 19, 1944

2,358,394

UNITED STATES PATENT OFFICE 2,358,394

ELECTRIC REGULATING CIRCUIT

Eugene H. Haug, Chicago, Ill., assignor, by direct and mesne assignments, to La Salle National Bank, Chicago, Ill., as trustee Application December 24, 1942, Serial No. 469,974

14 Claims. (Cl. 171—242)

My invention relates to electric regulating circuits and more particularly to such circuits utilizing electric resonant circuits of the constant potential to constant current type for regulating the current, voltage, or other electrical condition of an alternating current circuit.

Heretofore there have been proposed several arrangements of resonant circuits for obtaining constant current from constant potential for use in welding, series lighting, electric furnace, electro-chemical, etc. All these circuits have the defect of having their current or voltage regulation affected by the harmonic component of an alternating current sine wave. In certain arrangements of the prior art attempt has been made to overcome this defect by changing the ratio of a transformer, which is interposed between the resonant circuit and the load circuit.

All these arrangements had to be supplied with anti-hunting and other devices necessary to stabilize the automatic regulation of the system. By adding these devices the efficiency of the regulating system is lowered. Also additional electrical circuits add another source of possible regulator failure.

Since the modern trend is toward arc and vapour discharge devices for lighting, welding, etc., which produce a large amount of harmonic component in the regulating device, I have discovered the following regulating system.

It is an object of my invention, therefore, to provide an improved alternating current regulator for regulating an alternating current having an impressed voltage containing a harmonic component or a load producing a high harmonic component which will overcome the above mentioned disadvantages of the arrangements of the prior art and which will be simple and reliable in operation.

It is another object of my invention to provide an improved alternating current regulating system for performing different types of welding, such as arc and resistance welding, and causing least disturbance to the electric feeder systems.

In accordance with my invention a resonant circuit having the feature of directly filtering out the harmonic component of the sine wave, and having one or more elements of the resonant circuit automatically controlled by the load circuit, is energized by an alternating current of any form of wave. With such an arrangement the regulated circuit or voltage is not affected by the wave form distortion of the impressed voltage.

For a better understanding of my invention, together with other and further objects thereof, reference is had to the following description, taken in connection with the accompanying drawing, and its scope will be pointed out in the appended claims.

Figure No. 1 of the drawing illustrates an arrangement embodying my invention for operating a series lighting and welding load from a single phase alternating current. Figure No. 2 of the drawing illustrates an arrangement embodying my invention of operating a series lighting and welding load from a three phase alternating current supply.

Referring now to Figure No. 1 of the drawing there is illustrated an arrangement for obtaining constant current from a variable potential feeder circuit 1 and 2. The inductive reactors 3 and 4 are connected in series circuit relation by means of wire 5. A capacitor 5a is connected from wire 5 to feeder line 2. The inductive reactances 3 and 4, and the capacitative reactance 5a, are of equal reactance. Lines 6 and 7 are connected to the primary 10 of a suitable transformer 9 for obtaining correct current value to the load 8. The secondary 11 is connected to the load by means of wire 12 and 13, a saturating coil 16 is located across the lines 12 and 13 for by-passing the excess load current in a manner to hold the current constant to load 8.

The saturating reactor 16 is connected in parallel with a condenser 17 and is wound on a core 22 which also carries a saturating coil 21. The coil 21 is supplied with saturating current from a rectifier 18 connected to the coil through leads 19 and 20. A transformer 24 having a primary winding 23 connected in series in the line 6 has its secondary 25 connected through leads 26 and 27 to the rectifier 18 to supply current thereto.

The saturating reactor is formed by a core shown as of rectangular section although any closed sectional shape would be equally satisfactory. The reactor windings are similarly wound on adjacent legs of the core which are separated by a central leg on which the saturating winding 21 is wound. With this construction flux created by the saturating winding flows in opposite directions through the two reactor coils so that the wave front shape is not distorted since any tendency of the flux to create harmonics in this coil is counteracted by the same tendency in the opposite direction in the other coil. This construction also prevents the alternating current magnetism from affecting the direct current saturating winding and the direct current circuit associated therewith.

The condenser 17 is tuned to resonance with the saturating reactor when the saturation is low and provides therewith a multiple resonant circuit across the load circuit. Under normal operating conditions this prevents any flow of current through the saturating reactor so that there is no leakage loss but as the reactance of the reactor is varied by an increase in saturation the reactor and condenser become unbalanced to permit flow of current.

The operation of the above described apparatus is as follows: When constant current is produced by inductive reactance only higher harmonics in the voltage wave naturally are suppressed, the more the larger the inductive reactance, and the higher the order of the harmonic. An increase of the intensity of the harmonics in the current wave, over that in the voltage wave, and with it an impairment of the constant current regulation, can thus be expected only with devices using capacity reactance.

A mathematical treatise will show that the system of reactance I have invented will not impair the current regulation as found in all other constant current resonant circuits. Thus:

$$E_0 = \sum_1^\infty (e_n - j_n e_n') = \text{impressed voltage}$$

$$I = \sum_1^\infty \frac{j_n(e_n + j_n e_n')}{nx_0 - (n^2-1)[n(x_1+Kr)+jr]} = \text{secondary current}$$

For instance let $$E_0 = 660\sqrt{1+0.20^2+0.15^2+0.06^2+0.25^2}$$
$$= 6600 \times 1.062$$
$$= 7010 \text{ volt}$$

Let $$X_0 = 880 \text{ ohms}$$
$$X_1 = 508 \text{ ohms}$$
$$r' = 930 \text{ ohms}$$
$$K = 0.4$$

Substituting $$I = \sqrt{7.5^2 + \frac{604600}{(508+0.4r)^2}}$$

Hence, at no load $$I = 7.5 \times 1.00021$$

And at full load with $r = 930$ ohms $$I = 7.5 \times 1.00003$$

That is, the current is as perfect a sine wave as possible, regardless of the distortion of the impressed E. M. F., which, for instance, in the above example, contains a third harmonic of 32 per cent. Or in other words, in the connection of my invention, all harmonics of the E. M. F. are wiped out in the current wave, and this method indeed offers the best and most convenient means of producing perfect sine wave of current from any shape of E. M. F. waves.

In the event of voltage variation in the supply circuit, the output current of the resonant circuit will vary and through the current transformer 24 will vary the saturation of the reactor 16 so that the amount of current by-passed thereby will be varied to keep the load current constant. For example, if the supply voltage increases, the flow of current through the primary winding 23 will increase to increase the supply of current from the rectifier to the saturating winding 21. This will increase the saturation of the reactor 16 permitting a greater amount of current to be by-passed therethrough so that the increase in current supplied by the transformer 9 will not affect the current flow through the load circuit.

Figure 2 illustrates an application of the invention to a three phase supply circuit, parts therein corresponding to like parts in Figure 1 being indicated by the same reference numerals. In this construction the primary 10 of the transformer 9 is supplied through leads 28 and 29, the winding 23 being in series in the lead 28 and the lead 29 connecting the primary 10 to the reactor 4 forming a part of the resonant circuit. Three phase current is supplied through the leads 38 and 39 and 40 which are connected in a Scott connection to be changed to two phase. As shown, the leads 38 and 39 are connected to the opposite ends of the primary winding 32 of a transformer 33 and one side of the secondary winding 31 of the transformer is connected to the reactor 3. The other side of the primary winding is connected as shown to the condenser 5a. The third lead 40 is connected to one side of the primary winding 36 of a transformer 34, the other side of which is connected through lead 37 to the mid point of the primary winding 32. The secondary winding 35 of the transformer 34 is connected at one side to the lead 28 and at its other side to the condenser 5a.

With this circuit, the second phase of the two phase output of the transformer as supplied by the transformer 34 is connected in series with the resonant circuit. Since the second phase is 90° out of phase with the first phase and since the resonant circuit shifts the phase 90°, it will be noted that the output of the resonant circuit and the current supplied by the secondary winding 35 are in phase. With this construction, half of the load only is passed through the resonant circuit, the other half being carried by the second phase of the supply through the secondary winding 35. Thus the same load may be carried with a condenser and reactors in the resonant circuit only half as large as required for a single phase circuit as shown in Figure 1. Otherwise operation of the circuit is the same as that of Figure 1.

While I have described, what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination with an alternating current supply circuit, two inductive reactances in series circuit relation, a capacitative reactance connected at a point between the two said inductive reactances and the said alternating current supply circuit, a load circuit, a saturating reactor connected across said load circuit, and means to control the saturation of the reactor in a manner to hold the current to the load constant although the alternating current in the supply circuit may vary.

2. In combination with a constant potential supply, two inductive reactances and one capacitative reactance in resonant condition, a saturating reactor, a load circuit and a load, said inductive reactances in series circuit relation and said capacitative reactance connected at one end between the two said reactances and the constant current supply circuit, said saturating reactor being connected across said load circuit, and means to control saturation of the reactor in a manner to hold the current constant to the load.

3. In combination with an alternating current supply circuit, a resonant circuit connected to the supply circuit, a load circuit connected to the resonant circuit to be supplied therefrom, a saturating reactor connected across the load circuit, and means responsive to flow of current between the resonant circuit and the load circuit to control saturation of the reactor.

4. In combination with an alternating current supply circuit, a resonant circuit connected to the supply circuit, a load circuit connected to the resonant circuit to be supplied therefrom, a saturating reactor connected across the load circuit, a saturating winding on the reactor, a rectifier connected to the saturating winding, and a current transformer connected to the output side of the resonant circuit connected to the rectifier to supply it.

5. In combination with an alternating current supply circuit, a resonant circuit connected to the supply circuit, a load circuit connected to the resonant circuit to be supplied therefrom, a saturating reactor connected across the load circuit, a condenser in parallel with the reactor, a saturating winding on the reactor, and a current transformer in the output side of the resonant circuit connected to the saturating winding to supply current thereto.

6. In combination with an alternating current supply circuit, a resonant circuit connected to the supply circuit, a transformer having its primary connected to the resonant circuit, a load circuit connected to the secondary of the transformer, a saturating reactor connected across the load circuit, and means to control the saturation of the reactor.

7. In combination with an alternating current supply circuit, a resonant circuit connected to the supply circuit, a transformer having its primary connected to the resonant circuit, a load circuit connected to the secondary of the transformer, a saturating reactor connected across the load circuit, and means responsive to the current flow to the transformer primary to control the saturation of the reactor.

8. In combination with an alternating current supply circuit, a resonant circuit connected to the supply circuit, a transformer having its primary connected to the resonant circuit, a load circuit connected to the secondary of the transformer, a saturating reactor connected across the load circuit, a saturating winding on the reactor, a current transformer in the transformer primary circuit, and a rectifier connecting the current transformer to the saturating winding.

9. In combination with a poly phase alternating current supply circuit, a resonant circuit connected across one phase of the supply circuit, a load circuit connected in series with the resonant circuit and another phase of the supply circuit, a saturating reactor connected across the load circuit, and means to control the saturation of the reactor thereby to maintain the current flow in the load circuit substantially constant.

10. In combination with a poly phase alternating current supply circuit, a resonant circuit connected across one phase of the supply circuit, a load circuit connected in series with the resonant circuit and another phase of the supply circuit, a saturating reactor connected across the load circuit, and means responsive to current flow in the load circuit to control the saturation of the reactor.

11. In combination with a three phase three wire alternating current supply circuit, a transformer having its primary connected across two wires of the supply circuit, a resonant circuit connected to the secondary of the transformer, a second transformer having one side of its primary connected to the third wire of the supply circuit and the other side of its primary connected to the mid point of the first transformer primary, and a load circuit connected in series to the secondary of the second transformer and the resonant circuit.

12. In combination with a three phase three wire alternating current supply circuit, a transformer having its primary connected across two wires of the supply circuit, a resonant circuit connected to the secondary of the transformer, a second transformer having one side of its primary connected to the third wire of the supply circuit and the other side of its primary connected to the mid point of the first transformer primary, a load circuit connected in series to the secondary of the second transformer and the resonant circuit, a saturating reactor connected across the load circuit, and means responsive to current flow in the load circuit to control the saturation of the reactor.

13. In combination with an alternating current supply circuit, a resonant circuit connected to the supply circuit, a load circuit connected to the resonant circuit to be supplied therefrom, and a saturating reactor connected across the load circuit, a condenser in parallel with the reactor and in resonance therewith when the reactor is not saturated, and means to control the saturation of the reactor.

14. In combination with an alternating current supply circuit, a resonant circuit connected to the supply circuit, a load circuit connected to the resonant circuit to be supplied therefrom, and a saturating reactor connected across the load circuit, a condenser in parallel with the reactor and in resonance therewith when the reactor is not saturated, and means responsive to the current flow between the resonant circuit and load to control the saturation of the reactor.

EUGENE H. HAUG.